US005150866A

United States Patent [19]

Karpisek

[11] Patent Number: 5,150,866

[45] Date of Patent: Sep. 29, 1992

[54] SUPPORT FOR A HOSE FOR FILLING LIQUID INTO A CONTAINER

[76] Inventor: Ladislav S. Karpisek, 86 Woodfield Boulevarde, Caringbah, New South Wales, Australia, 2229

[21] Appl. No.: 697,713

[22] Filed: May 9, 1991

[30] Foreign Application Priority Data

May 14, 1990 [AU] Australia ............................ PK0125

[51] Int. Cl.[5] ............................................ F16M 13/00

[52] U.S. Cl. .................................. 248/79; 248/281.1; 248/585

[58] Field of Search ................. 248/79, 584, 585, 586, 248/280.1, 281.1, 364, 240, 240.4

[56] References Cited

U.S. PATENT DOCUMENTS

| | | | |
|---|---|---|---|
| 1,285,025 | 11/1918 | Burns | 248/585 X |
| 1,638,939 | 8/1927 | Koenigkramer | 248/586 |
| 1,759,878 | 5/1930 | Zizzo | 248/240.4 X |
| 2,967,433 | 1/1961 | Phillips | 248/586 X |
| 3,226,073 | 12/1965 | Jacobsen et al. | 248/586 |
| 3,233,745 | 2/1966 | Hershberger | 248/240 X |
| 3,547,390 | 12/1970 | Mehr | 248/585 X |
| 4,987,690 | 1/1991 | Aaldenberg | 248/281.1 X |

FOREIGN PATENT DOCUMENTS

| | | | |
|---|---|---|---|
| 1441075 | 4/1966 | France | 248/280.1 |

*Primary Examiner*—David L. Talbott
*Assistant Examiner*—Derek J. Berger
*Attorney, Agent, or Firm*—Edwin D. Schindler

[57] ABSTRACT

A hose support comprises two parallel link arrangements (7,10,12,16 and 8,16,13,18) to connect a hose mount (10) to a base (26), tensioned resilient means (25) connects an extension (38) of one link arrangement to an extension (34) of the base (26). There is a releasable tie bar/prop (21,22) connecting the base (26) to the extension (38) releasably to hold the hose mount (10) in a depressed position against the action of the resilient means (25) tending to move the hose mount (10) to a raised position.

5 Claims, 4 Drawing Sheets

SUPPORT FOR A HOSE FOR FILLING LIQUID INTO A CONTAINER

This invention is a hose support for use in a filling operation in which a container liner bag is filled with liquid.

It is common to transport and store up to 1000 liters of liquid in a plastic bag housed in a four sided rigid container. It is common for a container for the above purpose to be of a collapsible form comprised of four interlocking side panels with a first opposed pair of the panels anchored to a pallet and with the other pair of sides anchored to the first pair of sides. One such arrangement is known commercially as Pallecon (Trade Mark).

In the above arrangement there has been a problem with the filling of the plastic bags in that the bag prior to filling (and during filling) can adopt a slumped condition in which folded over bag portions are formed. If the folds are allowed to remain in place as the bag is filled the folded configuration can become fixed due to the pressure exerted by the liquid in the bag. The result is a decrease in the volume to which the bag can expand with a resultant decrease in the volume of liquid that can be placed in the bag. One method for overcoming this problem has been to inflate the bag with air prior to filling with liquid and to allow the air to escape as the bag is filled. This has not proved to be fully successful.

The present invention provides a hose support which will ensure a liner bag for a container is maintained free of folds during filling, at least to the extent required for the bag to hold its designed volume of liquid.

Broadly, the invention can be said to provide a hose support comprising two parallel link arrangements with respective first ends of the arrangements connected pivotally together and a second end of one link arrangement connected pivotally to a hose mount and a second end of the other link arrangement connected pivotally to a base so said hose mount will travel in a straight between a lower limit of travel and an upper limit of travel as said hose mount is moved relative to said base, an extension on said other link arrangement with the extension extending beyond said second end thereof, a connection point on said extension and a connection point on said base, a tensioned resilient biassing means connecting said connection points to pivot said other link arrangement relative to said base to move said hose mount to its upper limit of travel, a releasable prop means with a first end connected to said base and a second end connected to said extension releasably to maintain said hose mount at its lower limit of travel.

Figure 1:
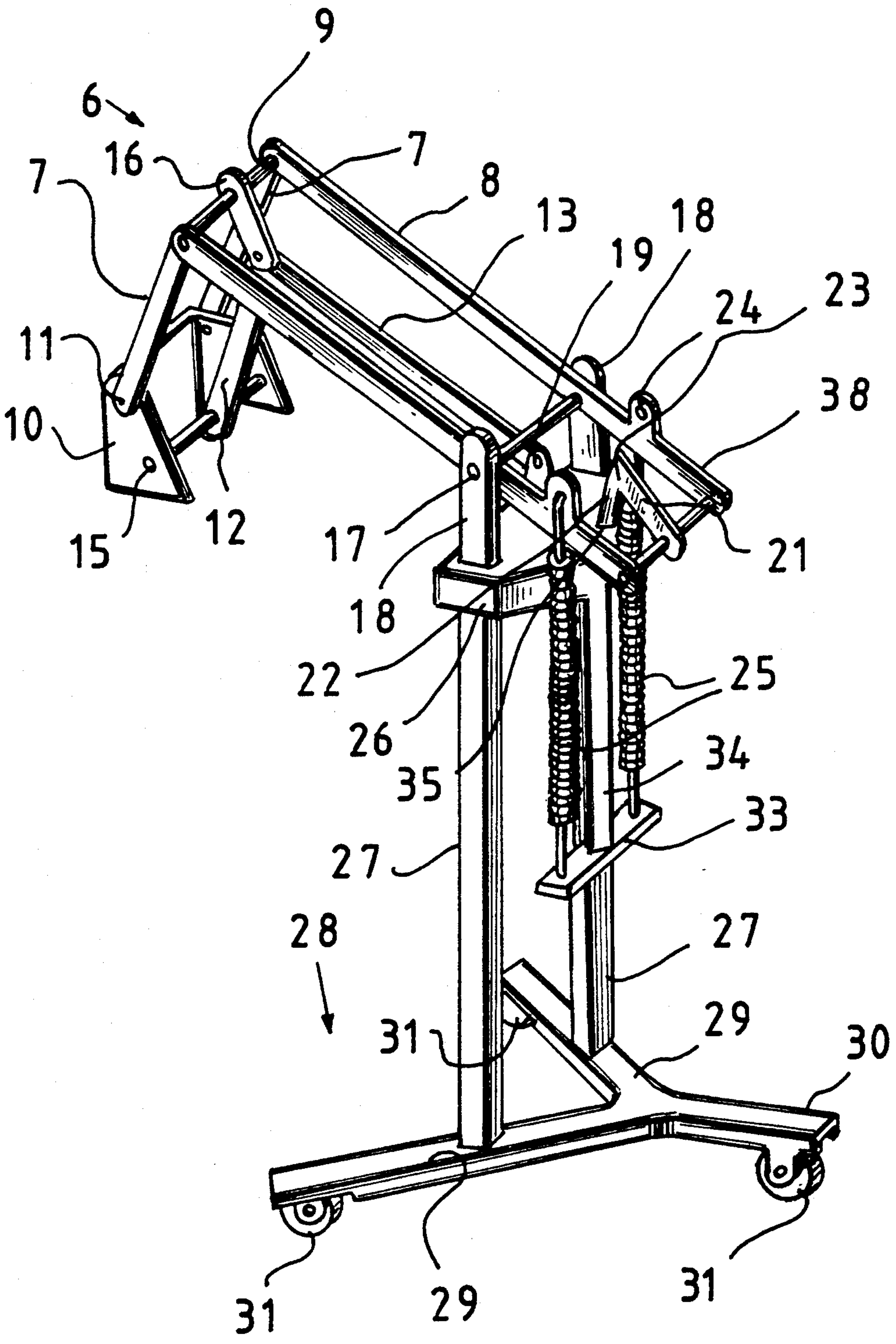
Figure 2:
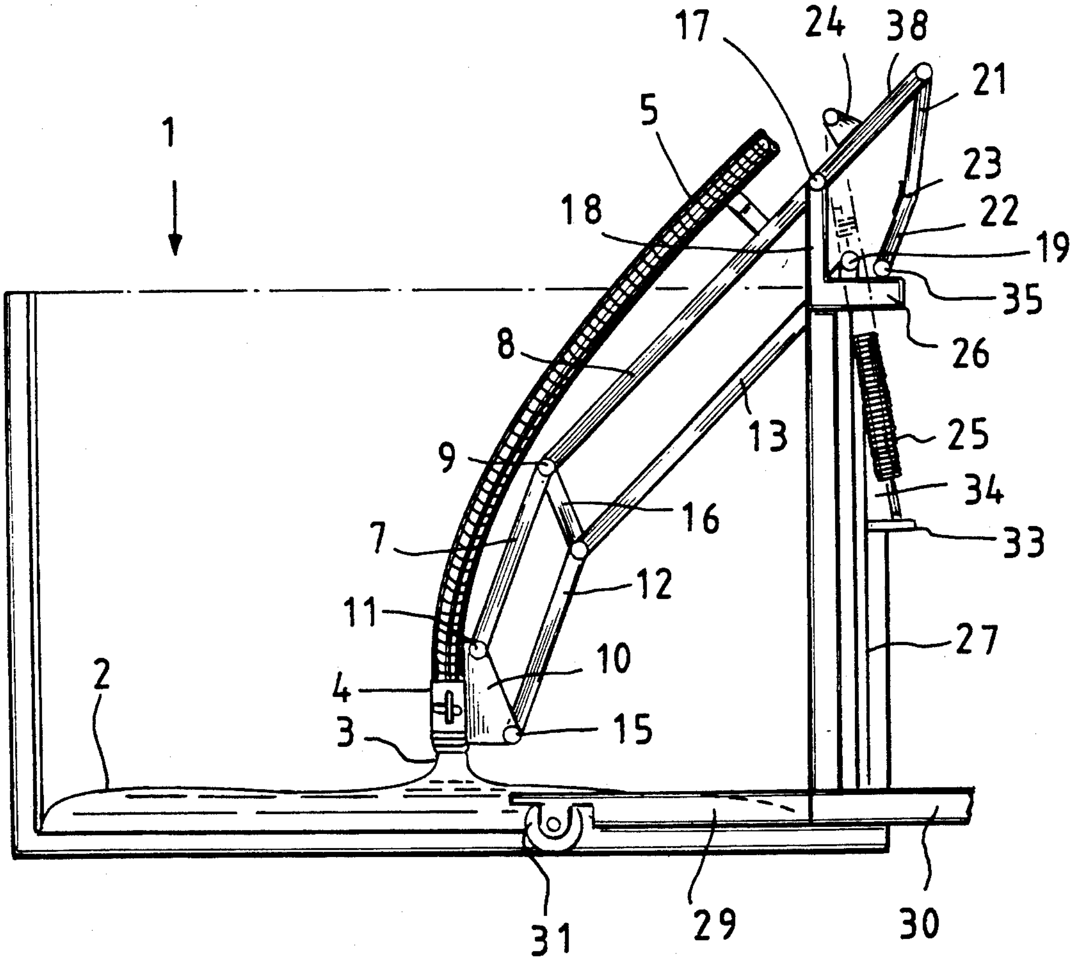
Figure 3:
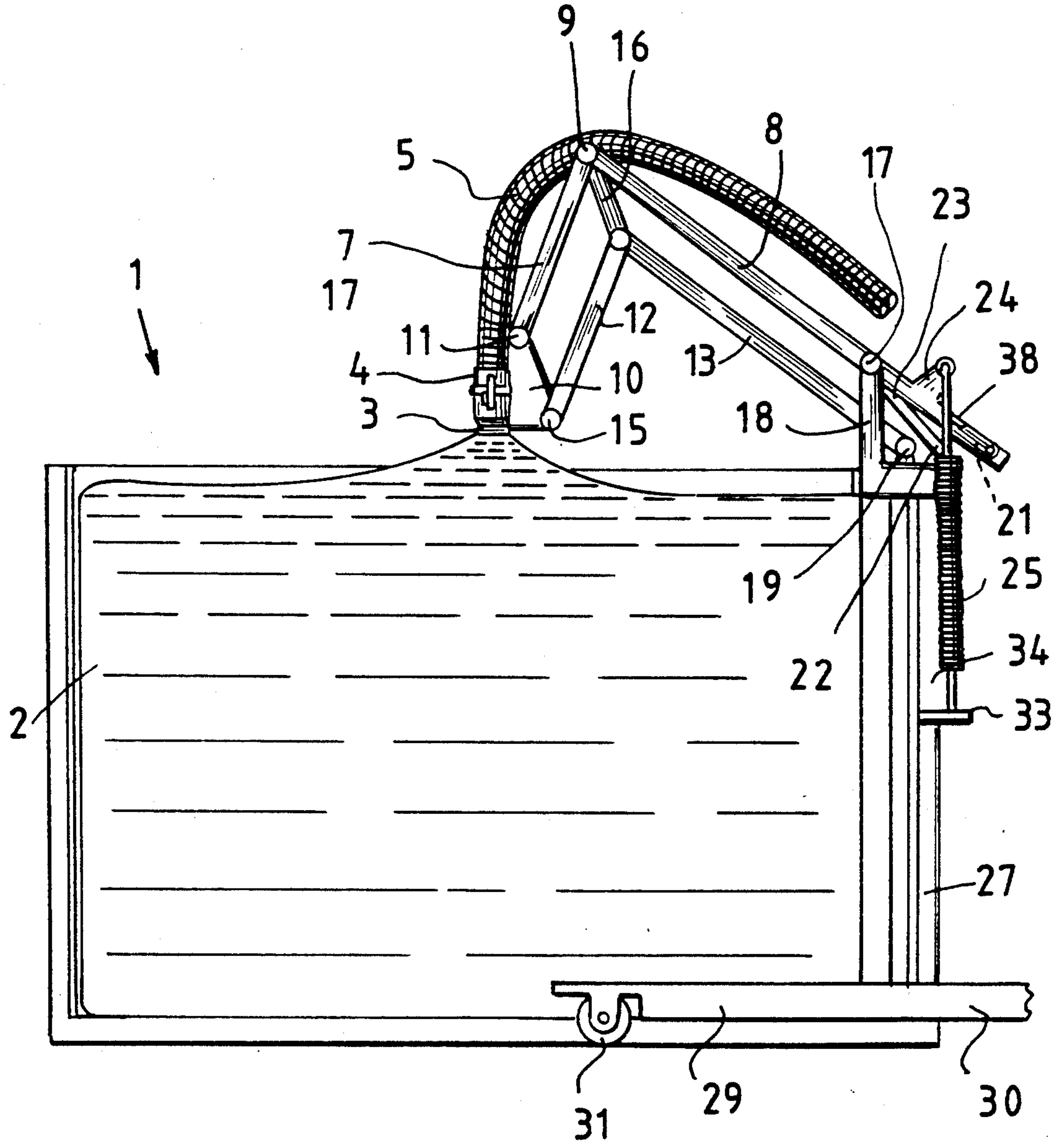
Figure 4:
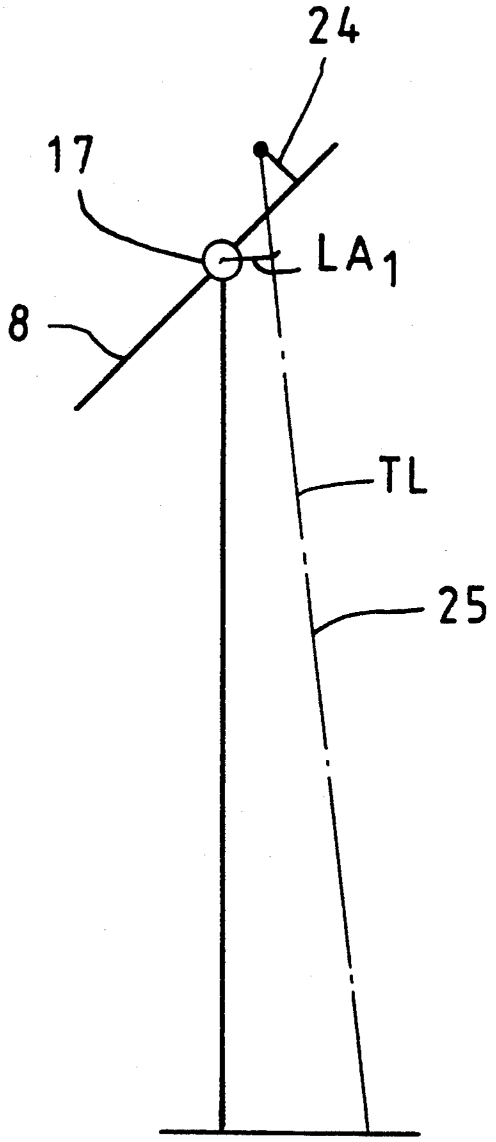
Figure 5:
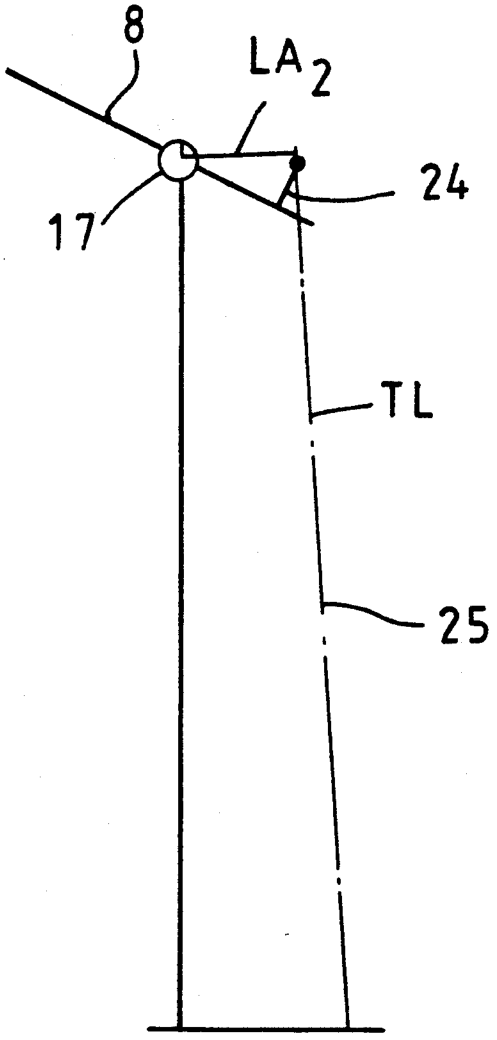

A presently preferred form of the hose support of this invention will now be described with reference to the accompanying drawings in which:

FIG. 1 is a perspective view of a first form of the hose support which is provided with wheels, FIG. 2 is a schematic side view of the hose support of FIG. 1 attached to a bag in a container with the bag partially filled, FIG. 3 is a view similar to FIG. 2 where the bag is completely filled, FIG. 4 is a schematic illustration of the geometry of the spring action for a first position of the hose support and FIG. 5 is a view similar to FIG. 4 for another position of the hose support.

The hose support of the invention is designed for use with a container 1 (see FIGS. 2 and 3) in which there is a liner bag 2 of plastic film material. There is a central nozzle 3 in the top face of the bag which is externally threaded in order to be engaged by a coupling end 4 of a filling hose 5 which is connected to a supply means for liquid, e.g. a pump or a gravity tank.

The hose support includes parallel link arrangements indicated generally 6. The link arrangements include a pair of upper links 7 and a pair of upper links 8 pivotally connected at corresponding first ends at 9 and to one end of a tie link 16. The other ends of the links 7 are connected pivotally at 11 to a hose mount 10.

There are two lower links 12 and 13. The lower link 12 is connected pivotally at one end at 15 to the hose mount 10 and at its other end to the tie link 16. The lower link 13 is connected pivotally at one end to the tie link 16 and at its other end at 19 to a head member 26 on two legs 27 which end on a foot member 28. The foot member 28 is of generally "Y" form with two limbs 29 substantially at right angles to each other and a third limb 30. All of the limbs 29,30 are provided with wheels 31 whereby the hose support is able to be moved from place to place. As will be explained later the hose support need not be of the wheeled form.

The links 8 are connected at 17 to posts 18 upstanding from the head 26 and extend therebeyond as indicated 38 and are connected pivotally to one end of a part 21 an articulated tie bar with the other tie bar part 22 pivotally connected to the head 26 at 35. The joint 23 connecting the tie bars parts 21–22 is of the overcentre locking type including a simple lug on one part which engages the other part when the tie bar is in the FIG. 2 configuration thereby limiting the pivotal movement in the direction of the arrow A and preventing the hose support rising from the depressed condition illustrated in FIG. 2. The arrangement allows free pivotal movement of the parts 21–22 in the opposite direction to collapse the tie bar to the condition in which the two parts 21–22 in side by side relationship and overlying the head 26. The hose support would then be in the condition illustrated in FIG. 3.

The hose support is biassed resiliently to the FIG. 3 condition by tension springs 25 (having a predetermined initial tension) with the springs connected at first ends to lugs 24 on the links 8 and connected at their other ends at 32 to a cross bar 33 on a downwardly extending leg 34 fixed to the head 26. The geometry of the spring attachment to the arm 8 is discussed later.

In a use sequence the bag nozzle 3 can be connected to the coupling end 4 of the hose 5 is one of several ways. It can be connected as shown in FIG. 2 where the hose support is lowered and locked in position by the tie bar 21–22 and the bag is then connected arranged as required in the container. Alternatively, a connection between the bag nozzle 3 and the hose coupling end 4 can be made when the hose support is in the raised condition and then the bag could be lowered into the container and the tie bar 21–22 can be locked to maintain the hose support in the depressed condition.

At the commencement of a filling operation the hose support would be locked by the tie bar 21–22 in the FIG. 2 condition. A small amount of liquid would be admitted to the bag to give it 'weight'. The tie bar 21–22 would be released. The bag nozzle will move upwardly in a straight line due to the parallel link arrangement and this is an important feature of the invention. Throughout the range of operation of the hose support the links 7 and 12 remain in parallel relationship and the links 8 and 13 also remain in parallel relationship. The result is a direct upward force to the bag to draw folds out of the bag as it is filled and whilst the quantity of liquid in the bag is only exerting a small force on folds formed as the bag was placed in the container. Any volume reducing folds will be of a minor form and if not removed during the filling operation will not be detrimental to the volume of liquid that can be stored in the bag because of the designed excess volume of the bag to cater for such minor folds.

The construction of the hose support using parallel acting links has a further advantage in that with a known device for the same purpose the bag nozzle is raised in a curved path and there was an applied lateral force on the bag nozzle. A lateral force can sometimes cause a leakage rupture where the bag nozzle is welded to the bag body, this problem is avoided with the arrangement of this invention.

With regard to the spring action during the filling operation, there is a design increase in the pivoting force exerted on the hose support as the bag is filled. Referring to FIG. 4, it will be seen that for the FIG. 2 condition the spring tension line TL is spaced from the pivot point 17 by a lever arm LA1 and the pivoting force applied to the hose support is the product of the spring tension X the length of the lever arm. FIG. 5 illustrates an advanced stage in the bag filling and it will be seen that the extension of the arm 8 to which the springs are attached has rotated and the lever arm LA2 is longer. Although there is a decrease in the spring load because of the shortening of the distance between the connection points 24 and 35 this is compensated for several times by the increase in the length of the lever arm. As a result there is an increase in the pivoting force applied to the hose support as the bag is filled, which is a desirable condition.

Although the embodiment described has a base with wheels it is to be understood that the hose support can be mounted in any suitable manner by clamps or the like directly to the container.

Although the embodiment described includes an articulated tie bar or prop this is a preferred feature. Other forms of prop could be used if desired.

I claim:

1. A hose support, comprising:

an arm having two arm parts and two ends with each of said arm parts being a parallel link arrangement and said two parallel link arrangements having a shared link so that said two arm parts are interconnected, said two ends of said arm being links of said parallel link arrangements which are both parallel to said shared link;

a hose mount fixed to one of said ends of said arm;

a base assembly fixed to one of said ends of said arm, other than said end affixed to said hose mount, with said parallel link arrangements lying in a common plane and said hose mount being able to travel in a straight line path in the common plane between a first limit of travel and a second limit of travel as said hose mount is being moved relative to said base assembly, said base assembly having a connection point thereon;

an arm extension projected beyond said end of said arm which is affixed to said base assembly with a connection point on said arm extension;

tensioned resilient means for connecting said connection point of said base assembly and said connection point of said arm extension for pivotally moving said arm relative to said base assembly and for biassing said hose mount towards its second limit of travel; and, prop means having a first end connected to said base assembly and a second end connected to said arm extension releasably for maintaining said hose mount at its first limit of travel.

2. The hose support as claimed in claim 1, wherein said resilient means include at least one tension spring.

3. The hose support as claimed in claim 2, wherein the location of said connection point on said extension arm is such that when said hose mount is at its second limit of travel, a line of spring action between said connection points lies further away from said end of said arm which is affixed to said base assembly than it does when said hose mount is at its first limit of travel.

4. The hose support as claimed in claim 1, wherein said prop means is an articulated member comprising two sections pivotally connected to one another, said prop means having a folded condition wherein said two sections lie substantially side-by-side when said hose mount is at its second limit of travel and an unfolded condition when said hose mount is at its first limit of travel, and further including stop means for limiting movement of said prop means in an unfolding direction.

5. The hose support as claimed in claim 4, wherein an increasing angle is provided between said two sections as said prop means unfolds, said stop means comprising a lug on one of said two sections capable of engagement by the section not being provided with said lug when an angle formed between said two sections in the unfolding direction becomes a reflex angle.

* * * * *